United States Patent [19]

Kamigaito et al.

[11] Patent Number: 4,824,262
[45] Date of Patent: Apr. 25, 1989

[54] UNLUBRICATED SLIDING MEMBER

[75] Inventors: Osami Kamigaito; Haruo Doi; Shoji Noda; Masao Kouzaki, all of Aichi, Japan

[73] Assignee: Kabushiki Kaisha Toyota Chuo Kenkyusho, Aza Yokomichi, Japan

[21] Appl. No.: 100,946

[22] Filed: Sep. 25, 1987

[30] Foreign Application Priority Data

Sep. 27, 1986 [JP]  Japan ................................ 61-229066
Sep. 2, 1987 [JP]  Japan ................................ 62-219497

[51] Int. Cl.[4] ........................ F16C 29/00; F16C 33/02
[52] U.S. Cl. ........................................ 384/42; 384/276;
384/297; 384/625; 384/907.1
[58] Field of Search ............... 384/29, 42, 92, 95,
384/276, 280, 297, 420, 425, 625, 907, 907.1,
910, 913

[56] References Cited

U.S. PATENT DOCUMENTS

| | | | |
|---|---|---|---|
| 2,624,097 | 1/1953 | Kistler | 384/907.1 X |
| 2,901,380 | 8/1959 | Crump | 384/322 X |
| 2,987,352 | 6/1961 | Watson | 384/913 X |
| 3,606,498 | 9/1971 | Ohno | 384/42 |
| 3,711,171 | 1/1973 | Orkin et al. | 384/297 |
| 4,522,453 | 6/1985 | Lammer et al. | 384/42 |
| 4,678,678 | 1/1985 | Kamigaito | 427/38 |

FOREIGN PATENT DOCUMENTS 57-118080  7/1982  Japan .
57-114028  7/1982  Japan .
57-188474  11/1982  Japan .

*Primary Examiner*—Stuart S. Levy
*Assistant Examiner*—Thomas R. Hannon
*Attorney, Agent, or Firm*—Oblon, Fisher, Spivak, McClelland & Maier

[57] ABSTRACT

An unlubricated sliding member composed of a pair of sliding bodies. The sliding part of one sliding body is composed of a ceramic base portion and a thin film of, for example, Nb, which is integrally provided on the surface of the base portion. The sliding part of the other sliding body is composed of a diamond containing surface.

The sliding member enables the coefficient of the friction caused when the pair of sliding bodies slide to be reduced, thereby keeping a long life of the sliding member.

If the ceramic base portion is further subjected to ion implantation, the wear resistance of the sliding member is enhanced.

12 Claims, 3 Drawing Sheets

UNLUBRICATED SLIDING MEMBER

BACKGROUND OF THE INVENTION

1. Field of the Invention

The present invention relates to an unlubricated sliding member which is used under a condition in which supply of a lubricating oil or the like is difficult or impossible.

2. Description of the Prior Art

A sliding member is generally composed of a first sliding body having a first sliding part and a second sliding body having a second sliding part which comes into sliding contact with the first sliding part.

In such a sliding member, an attempt of producing the first sliding part and the second sliding part from a ceramic material has been made. However, since ceramic has poor toughness, the first and second sliding parts which are made of a ceramic material are susceptible to surface damage during sliding. As a result, the abrasive wear progresses and the sliding member is apt to have a comparatively short durability.

It is known that the surface damage produced on a ceramic sliding member is caused by a tensile stress which is produced in the vicinity of the sliding surface and is called "tensile spike".

The tensile stress which is called tensile spike depends on the friction coefficient of the sliding surface and if the friction coefficient is reduced, the tensile stress is reduced.

In order to reduce the friction coefficient, a lubricating oil is applied to the sliding surface or a solid lubricant is contained in the sliding surface However, a lubricating oil is apt to deteriorate, in particular, when it is used in the place which receives radiation or at high temperature.

As a sliding member which has a solid lubricant in the sliding surface, there are known a sliding member with molybdenum disulfide or fluorocarbon resin immersed into a porous ceramic sintered body, which is disclosed in Japanese Patent Laid-Open No. 118080/1982, and a sliding member having a sintered body consisting of a mixed powder of a ceramic powder and molybdenum disulfide, which is disclosed in Japanese Patent Laid-Open Nos. 188474/1982 and 114028/1982. However, even if a solid lubricant is contained, the friction coefficient is about 0.13, the value being not always satisfactory.

As an example of a sliding member which does not use a lubricating oil or a solid lubricant, there are known sliding members consisting of a zirconia or silicon nitride substrate with Ti, Ni or Co deposited thereon and further subjected to $Ar^+$ implantation, and a Ti-C-Ni-Mo pin. Such sliding members and their friction coefficients are reported in *Friction and Wear of Ion Beam Modified Ceramics;* J. Matter, Sci., 22 PP 2069 to 2087 (1987). In this report, a friction coefficient between the partially stabilized zirconia surface with a Co thin film formed thereon and a TiC cement bonded with Ni and Mo (TiC(Ni, Mo)), and a friction coefficient between the partially stabilized zirconia surface with a Ti and Ni thin film formed thereon and TiC(Ni, Mo) are shown. These friction coefficients are 0.08 and 0.09, respectively, at a temperature of 800° C. in the atmosphere of an exhaust gas of a diesel engine. These values cannot be said to be satisfactory values for practical use, and the condition for use of such a sliding member is limited. In addition, the friction coefficients at room temperature are more than 0.2.

SUMMARY OF THE INVENTION

Accordingly, it is an object of the present invention to eliminate the above-described problems in the prior art and to provide an unlubricated sliding member which is capable of reducing the friction coefficient of the ceramic sliding member without using a lubricating oil or a solid lubricant.

It is another object of the present invention to provide an unlubricated sliding member which has a longer durability than a conventional one.

As a result of studying the sliding of ceramic, the present inventors have found that the friction coefficient of a ceramic against diamond is reduced to such a small value as not more than 0.01 if the ceramic surface is coated by a metal such as Nb or an oxide thereof. In addition, it has been found that the wear resistance is greatly enhanced when the ceramic surface coated with the above-described metal or an oxide thereof is subjected to ion implantation. The unlubricated sliding member according to the present invention has been accomplished on the basis of these findings.

To sum up, the unlubricated sliding member according to one aspect of the present invention comprises a first sliding body having a first sliding part and a second sliding body having a second sliding part which comes into sliding contact with the first sliding part, and is characterized in that the first sliding part is composed of a ceramic base portion and a thin film which is integrally provided on the surface of the ceramic base portion, and which is composed of at least one selected from the group consisting of metals of Nb, Cr, Ti, Zr, Hf, Y and Si and oxides thereof, and in that the second sliding part is composed of a diamond containing surface.

The unlubricated sliding member according to another aspect of the present invention is characterized in that the surface of the ceramic base portion of the first sliding part with the above-described thin film integrally provided thereon is further subjected to ion implantation.

According to an unlubricated sliding member of the present invention, it is possible to reduce the friction coefficient between the first and second sliding parts. Therefore, it is possible to keep a long life of the sliding member.

In addition, the wear can be greatly reduced in the unlubricated sliding member having the surface of the ceramic surface with a thin film integrally provided thereon and further subjected to ion implantation.

The above and other objects, features and advantages of the present invention will become more apparent from the following description when taken in conjunction with the accompanying drawings in which preferred embodiments of the invention are shown by way of illustrative examples.

DESCRIPTION OF THE PREFERRED EMBODIMENTS

Figure 1:
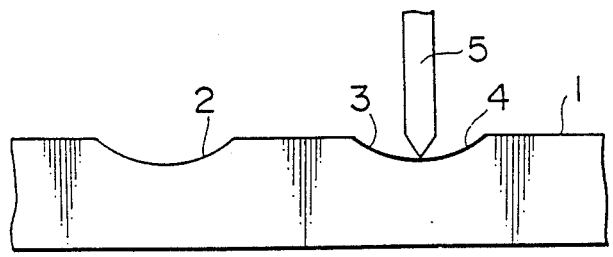
FIG. 1 schematically shows the structure of the main part of a sliding member in Example 3.

As a material for forming a thin film of a first sliding part, at least one selected from the group consisting of metals of Nb, Cr, Ti, Zr, Hf, Y, Si and oxides thereof is usable. In the case of using two or more metals in the form of an oxide, either a mixture of metal oxides or an oxide of a composite metals may be used.

For the formation of the thin film, electron beam deposition, sputtering, ion plating, cluster ion beam deposition, etc. may be adopted. The thickness of the thin film may be varied as occasion demands, but it is generally preferable to be 100 angstrom to 1 $\mu$m. If it is less than 100 angstrom, the effect of reducing the friction coefficient is not always accomplished, while if it exceeds 1 $\mu$m, the friction coefficient increases by the ploughing of the diamond.

The typical ions which are implanted on the ceramic surface with the thin film formed thereon are $H^+$, $He^+$, $N^+$, $O^+$, $Ar^+$, $Si^+$, $Kr^+$ and $Xe^+$. Other ions may be used.

The implantation energy is determined so that the penetration depth of the implanted ions is deeper than the thickness of the film. This is because if the ions penetrate the thin film, the adhesive strength between the thin film and the ceramic base is improved efficiently. The fluence of ion is preferably $5 \times 10^{14}$ ions/cm$^2$ to $5 \times 10^{17}$ ions/cm$^2$. If the fluence of ion is less than $5 \times 10^{14}$ ions/cm$^2$, the adhesiveness between the thin film and the ceramic base portion is not improved, and sometimes causes separation of the thin film. On the other hand, ion implantation excess of $5 \times 10^{17}$ ions/cm$^2$ does not bring about more prominent low friction and wear resistive effect, and inefficiently requires a long ion implantation time.

As a ceramic material for the base portion of the first sliding member, oxide, nitride and carbide ceramics which are conventionally used are usable, and typical examples are alumina, mullite, zirconia, silicon nitride and silicon carbide. In this case, the ceramic base portion may be a ceramic sintered body, a ceramic single crystal or a ceramic coated layer.

The second sliding part has a diamond containing surface. The diamond contained in the diamond containing surface may be either natural diamond or an artificial product.

The first sliding part may be composed of a ceramic base portion which constitutes a bearing portion having a shaft hole and a thin film formed on the surface of the inner peripheral portion which constitutes the shaft hole of the bearing portion. In this case, the second sliding part may be a shaft portion which is inserted into the shaft hole rotatably or linearly reciprocatably and which has a diamond containing surface.

Alternatively, the second sliding part may be a bearing portion having a shaft hole and a diamond containing surface at the inner peripheral portion which constitutes the shaft hole. In this case, the first sliding part may be composed of a ceramic base portion which constitutes a shaft portion inserted into the shaft hole rotatably or linearly reciprocatably and a thin film formed at the outer peripheral portion of the shaft portion.

Alternatively, the first sliding part is composed of a ceramic portion which constitutes a rail and a thin film which is formed on the surface of the outer peripheral portion of said rail, and said second sliding part is a sliding component which reciprocates along the rail and which has a diamond containing surface.

The first sliding part may be composed of a ceramic portion which constitutes a rail and a thin film which is formed on the surface of the outer peripheral portion of said rail, and said second sliding part may be a sliding component which reciprocates along the rail and which has a diamond containing surface.

In the above-described bearing and the composition of rail and sliding component, the surface of the ceramic base portion of the first sliding part with the thin film formed thereon may be subjected to ion implantation.

[EXAMPLE 1]

An unlubricated sliding member in Example 1 was composed of a first sliding body having a first sliding part and a second sliding body having a second sliding part.

The first sliding part was composed of a ceramic base portion consisting of a mirror-polished alumina sintered body (10×20×30 mm) and a metal thin film formed by vacuum deposition of Nb on about half of a predetermined surface (10×20 mm) of the ceramic base portion. Therefore, half of the predetermined surface of the ceramic base portion was covered with the metal thin film, while the surface of the alumina sintered body was exposed as it was to the other half of the predetermined surface. The thickness of the metal thin film is about 1,000 angstrom.

The second sliding part had a diamond containing surface having a diamond pin which had a radius of 0.2 mm at its tip.

A load of 50 g was applied to the diamond containing surface and caused the second sliding part to slide repeatedly on the metal thin film at a sliding speed of 10 mm/min and at the temperature of 25° C. The tangential force (Ft) was measured and the friction coefficient was measured from the formula: friction coefficient $\mu = Ft/FN$. As the result of the test, the friction coefficient u was 0.01, and no chipping was produced after more than 1,000 sliding tests.

In contrast, when the surface of the alumina sintered body of the ceramic base portion with no thin film formed thereon was caused to slide under the same conditions, the friction coefficient $\mu$ was 0.1±0.02. When the sliding tests were repeated, chipping was caused on the alumina surface, and the friction coefficient $\mu$ sometimes became more than 0.15. In other words, the friction coefficient of alumina was larger by about 10 times than the metal film coated alumina.

The depositing metals were varied and the coefficient between the deposition surface and the diamond containing surface was measured. The results are shown in Table 1. The friction coefficient between the surface of the alumina sintered body without deposition and the diamond containing surface is also shown in Table 1. The conditions for measuring the friction coefficients were the same as the above.

As shown in Table 1, when the metal constituting the metal thin film was Cr, the friction coefficient of the metal thin film was as small as 0.03, and that of the undeposited surface was as large as 0.08. When the metal constituting the metal thin film was Ti, the friction coefficient of the undeposited surface was as large as 0.09, while that of the metal thin film, which was the deposited surface, was as small as 0.06. When the metal constituting the metal thin film was Zr, while the friction coefficient of the undeposited surface was as large as 0.09, that of the deposited surface was as small as 0.05. When the metal constituting the metal thin film was Pt or Fe, the friction coefficient between the metal thin film and the diamond containing surface was increased, as is clear from Table 1. When the metal constituting the metal thin film was gold, the friction coefficients in both cases were about 0.10, and no difference between the deposited surface and the undeposited surface was observed.

TABLE 1

| Depositing metal | Deposited surface | Undeposited surface |
| --- | --- | --- |
| Nb | 0.01 | 0.09 |
| Cr | 0.03 | 0.08 |
| Ti | 0.06 | 0.09 |
| Zr | 0.05 | 0.09 |
| Pt | 0.16 | 0.10 |
| Fe | 0.22 | 0.11 |
| Au | 0.10 | 0.10 |

[EXAMPLE 2]

An unlubricated sliding member in Example 2 had almost the same structure as that in Example 1 except that the metal thin film of the unlubricated sliding member in Example 2 was formed by the vacuum deposition of Nb and the subsequent implantation of $1 \times 10^{17}$ ions/cm$^2$ of helium ions of 2 MeV on the deposited surface.

The friction coefficient of the unlubricated sliding member in Example 2 was tested under the same conditions as in Example 1. The friction coefficient $\rho$ between the metal thin film and the diamond containing surface was as small as $0.01 \pm 0.005$.

On the other hand, the friction coefficient $\mu$ between the ceramic base portion consisting of the alumina sintered body and the diamond containing surface was as large as $0.09 \pm 0.02$.

Further, $1 \times 10^{17}$ ions/cm$^2$ of argon ions of 1 MeV and $2 \times 10^{17}$ ions/cm$^2$ of nitrogen ions of 400 KeV were respectively implanted on the metal thin film formed by the vacuum deposition of Nb. The friction coefficients between the metal thin films and the diamond containing surface were about 0.01 in both cases.

It should be noted that the ion irradiations decompose or polymerize a lubricating oil and then degrade it severely.

[EXAMPLE 3]

An unlubricated sliding member in Example 3 had almost the same structure as that in Example 1 except that a silicon nitride sintered body was used for the ceramic base portion and Si was used for the metal thin film in the unlubricated sliding member in Example 3.

The friction coefficient was examined under the same conditions in Example 1 except that a load of 300 g was applied in place of 50 g. The friction coefficient $\mu$ was not more than 0.01 and no chipping was caused after more than 1,000 sliding tests.

In contrast, when the surface of the silicon nitride sintered body of the ceramic base portion with no thin film formed thereon was caused to slide under the same conditions, the friction coefficient $\mu$ was $0.07 \pm 0.005$.

When the sliding tests were repeated, chipping was caused on the silicon nitride surface, and the friction coefficient $\mu$ sometimes became more than 0.15. In other words, the friction coefficient of the silicon nitride was larger by about 10 times than the silicon deposited one.

The materials of the ceramic substrate on which Si was deposited were varied, and the friction coefficient between the surface of the Si thin film and the diamond containing surface was examined. The results are shown in Table 2. The friction coefficient between the surface of the ceramic substrate without Si deposition and the diamond containing surface is also shown in Table 2. The conditions for measuring the friction coefficients were the same as the above.

TABLE 2

| Ceramic substrate | Si deposited surface | Undeposited surface |
| --- | --- | --- |
| Silicon nitride | 0.01 | 0.07 |
| Zirconia | 0.01 | 0.10 |
| Silicon carbide | 0.03 | 0.08 |

As shown in Table 2, when the ceramic material for the substrate was silicon nitride or zirconia, the friction coefficient was reduced to 0.01 by deposition of Si. Even the substrate was made of SiC, the friction coefficient of the Si deposited surface was 0.03, much smaller than that of the undeposited surface.

[EXAMPLE 4]

An unlubricated sliding member in Example 4 had almost the same structure as that in Example 1 except that the metal thin film of the unlubricated sliding member in Example 4 was formed by the vacuum deposition of Si and the subsequent implantation of $1 \times 10^{17}$ ions/cm$^2$ of helium ions of 2 MeV on the deposited surface.

The friction coefficient of the unlubricated sliding member in Example 4 was tested under the same conditions as in Example 1. The friction coefficient $\mu$ between the metal thin film and the diamond containing surface was as small as $0.01 \pm 0.005$.

On the other hand, the friction coefficient $\mu$ between the ceramic base portion consisting of the silicon nitride sintered body and the diamond containing surface was as large as $0.09 \pm 0.02$.

Further, $1 \times 10^{17}$ ions/cm$^2$ of argon ions of 1 MeV and $2 \times 10^{17}$ ions/cm$^2$ of nitrogen ions of 400 KeV were respectively implanted on the metal thin film formed by the vacuum deposition of Si. The friction coefficients between the metal thin films and the diamond containing surface were about 0.01 in both cases.

It is clear that the sliding member is of high resistivity against ionizing radiation.

[EXAMPLE 5]

An unlubricated sliding member in Example 5 had almost the same structure as that in Example 1 except that the ceramic base portion was composed of a silicon carbide sintered body, the metal thin film was formed by the vacuum deposition of Nb and the subsequent implantation of $2 \times 10^{16}$ ions/cm$^2$ of Ar$^+$ of 280 KeV on the deposited surface, and the diamond pin at the second sliding part had a radius of 3 mm at its tip in Example 5.

A load of 500 g was applied to the diamond containing surface of the second sliding part and caused it to rotationally slide on the metal thin film at a sliding speed of 2 mm/min. The tangential force (Ft) was measured and the friction coefficient was measured from the formula: friction coefficient $\mu = Ft/FN$. As the result of the test, the friction coefficient $\mu$ was 0.05, and no chipping was produced after more than $2 \times 10^5$ rotational sliding tests.

In contrast, when the surface of the silicon carbide sintered body of the ceramic base portion with no thin film formed thereon was caused to slide under the same conditions, the friction coefficient $\mu$ was $0.1 \pm 0.02$. When the sliding tests were repeated, chipping was caused on the silicon carbide surface, and the friction coefficient $\mu$ sometimes became more than 0.15. In other words, the friction coefficient of the silicon carbide was larger by about 3 times than the metal deposited one.

Figure 5:
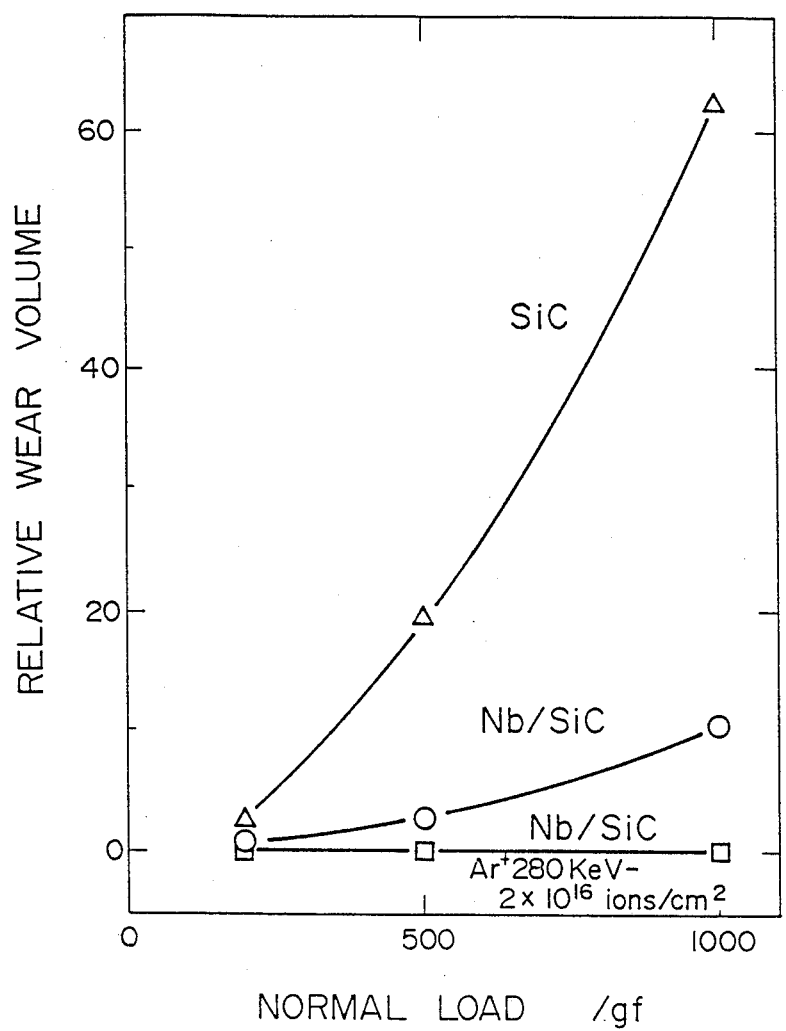
FIG. 5 shows the dependence of relative wear volume on the normal load.
Figure 6:
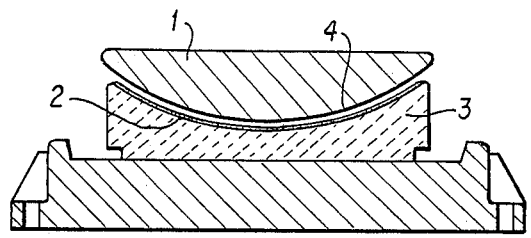
FIGS. 6, 7 and 8 schematically show unlubricated sliding members in which 1 is the shaft or sliding component, 2 is the thin film, 3 is the ceramic bearing or rail portion, and 4 is the diamond containing surface.
Figure 7:
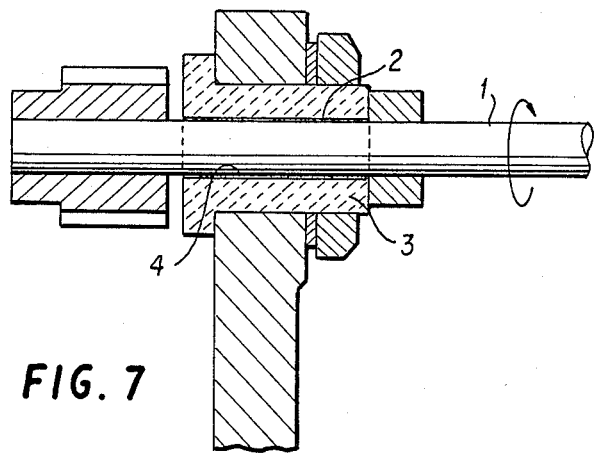
Figure 8:
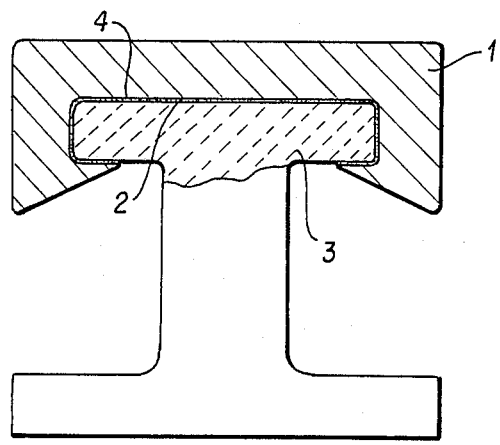

FIG. 5 shows dependence of relative wear volume on normal load. The abscissa shows the normal load and the ordinate shows the relative wear volume when the wear volume is set to be 1 in the case of silicon carbide with the thin film of Nb on the surface thereof under the normal load of 200 gf.

In FIG. 5, the curve represented by the symbol $\Delta$ shows the case of only silicon carbide. The curve represented by the symbol $\bigcirc$ shows the case of silicon carbide having the Nb thin film on the surface thereof. The curve represented by the symbol $\square$ shows the case of silicon carbide having the Nb thin film formed thereon and subjected to the implantation of $2 \times 10^{16}$ ions/cm$^2$ of argon ions of 280 KeV on the surface thereof. The rotational sliding tests were made $2 \times 10^5$ times.

When Ar$^+$ ions were implanted, the enhancement of the wear resistance was remarkable, and almost no wear was observed. When Ar$^+$ ions were not implanted, a little amount of wear was observed as the load increases.

In contrast, the wear of the silicon carbide surface of the ceramic base portion was increased with the increase in the normal load (see FIG. 5).

[EXAMPLE 6]

An unlubricated sliding member in Example 6 had almost the same structure as in Example 1 except that the thin film was made of an Nb oxide.

The friction coefficient of the unlubricated sliding member in Example 6 was examined under the same condition as in Example 1.

The friction coefficient $\mu$ was 0.01 and no chipping was caused after more than 1,000 sliding tests.

In contrast, when the surface of the alumina sintered body of the ceramic base portion was caused to slide under the same conditions, the friction coefficient $\mu$ was $0.1 \pm 0.02$. When the sliding tests were repeated, chipping was caused on the alumina surface, and the friction coefficient $\mu$ sometimes became more than 0.15. In other words, the friction coefficient of alumina was larger by about 10 times than the niobium oxide deposited one.

The depositing oxides were varied and the friction coefficient between the surface portion of the oxide thin film, which was the deposition surface, and the diamond containing surface was measured. The results are shown in Table 3. The friction coefficient between the surface portion of the alumina sintered body, which was an undeposited portion, and the diamond containing surface is also shown in Table 3. The conditions for measuring the friction coefficients were the same as the above.

As shown in Table 3, when the oxide constituting the oxide thin film was a Cr oxide, the friction coefficient of the oxide thin film was as small as 0.03, and that of the undeposited surface was as large as 0.08. When the oxide constituting the oxide thin film was a Ti oxide, the friction coefficient of the undeposited surface was as large as 0.09, while that of the oxide thin film, which was the deposited surface, was as small as 0.06. When the oxide constituting the oxide thin film was a Zr oxide, while the friction coefficient of the undeposited surface was as large as 0.09, that of the deposited surface was as small as 0.05. When the oxide constituting the oxide thin film was an Fe oxide, the friction coefficient between the oxide thin film and the diamond containing surface was increased, as is clear from Table 3.

TABLE 3

| Depositing oxide | Deposited surface | Undeposited surface |
|---|---|---|
| Nb oxide | 0.01 | 0.09 |
| Cr oxide | 0.03 | 0.08 |
| Ti oxide | 0.06 | 0.09 |
| Zr oxide | 0.05 | 0.09 |
| Fe oxide | 0.22 | 0.11 |

[EXAMPLE 7]

An unlubricated sliding member in Example 7 had almost the same structure as that in Example 6 except that the oxide thin film of the unlubricated sliding member in Example 7 was formed by the vacuum deposition of an Nb oxide and the subsequent implantation of $1 \times 10^{17}$ ions/cm$^2$ of helium ions of 2 MeV on the deposited surface.

The friction coefficient of the unlubricated sliding member in Example 7 was measured under the same conditions as in Example 1. The friction coefficient $\mu$ between the oxide thin film and the diamond containing surface was as small as $0.01 \pm 0.005$.

On the other hand, the friction coefficient $\mu$ between the ceramic base portion consisting of the alumina sintered body and the diamond containing surface was as large as $0.09 \pm 0.02$.

Further, $1 \times 10^{17}$ ions/cm$^2$ of argon ions of 1 MeV and $2 \times 10^{17}$ ions/cm$^2$ of nitrogen ions of 400 KeV were respectively implanted on the oxide thin film formed by the vacuum deposition of an Nb oxide. The friction coefficients between the oxide thin films and the diamond containing surface were about 0.01 in both cases.

[EXAMPLE 8]

Conical pits 2 and 3 having a radius of 0.3 mm were formed on a 1-mm thick sapphire substrate 1 shown in FIG. 1, and the pits were subjected to mirror polish. The substrate 1 was thereafter subjected to heat treatment at 1,500° C. under atmospheric pressure for about 5 hours to remove the residual stress due to machining. Nb was vacuum deposited on one pit 3 to a thickness of 100 angstrom to form a metal thin film 4. The surface of the other pit 2 remains the sapphire surface.

In the state in which diamond pivot shafts 5 having a radius of 0.10 mm at their tips were brought into contact with the respective pits 2 and 3, a load of 20 gf was applied vertically, and each pivot shaft 5 was caused to rotationally slide at 100 rpm for 1 hour. When the bottom portions of the pits 2 and 3 were observed by an optical microscope after this test, a crack (mainly lateral crack) was found at the bottom portion of the pit 2, which was an undeposited portion.

On the other hand, the metal thin film 4 of the pit 3, which was an Nb deposited portion, had produced no separation of the film, nor any crack was observed from the back surface of the pit 3.

The same tests were carried out on an Si thin films, an Nb oxide thin film, and an Nb thin film which had been implanted with $2 \times 10^{16}$ ions/cm$^2$ of Ar$^+$ of 280 KeV. The same results as the above were obtained in all of these cases.

[EXAMPLE 9]

The ceramic base portion 11 of a first sliding body 10 consisting of an alumina sintered body 10 mm in diameter and 100 mm in length was subjected to mirror polish. Nb was deposited by electron beams on longitudinally half of the surface portion of the first sliding body 10 to a thickness of 100 angstrom, thereby forming a metal thin film 12. The alumina sintered body remained exposed to the other half surface portion of the first sliding body 10. This first sliding body 10 was used as a sample.

Figure 2:
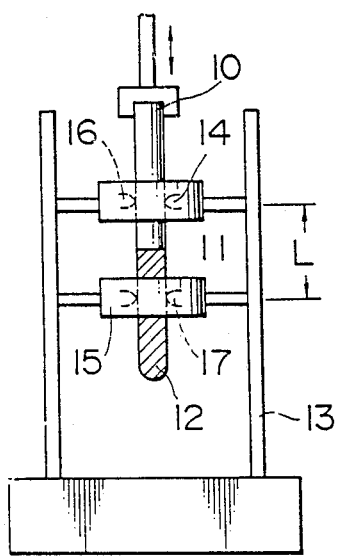
FIG. 2 is a schematic side view of a testing apparatus in Example 4.
Figure 3:
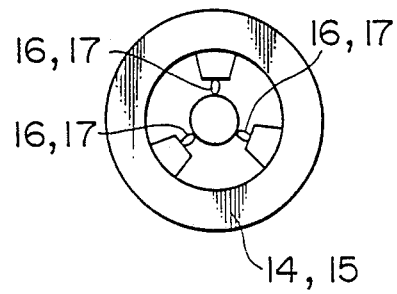
FIG. 3 is a plan view of the testing apparatus shown in FIG. 2.
Figure 4:
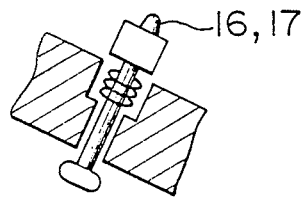
FIG. 4 is a sectional view of the main part of the testing apparatus shown in FIG. 2.

The sample was set at a testing machine 13 with the shafts projected in advance which is shown in FIGS. 2 to 4. The sample was caused to vertically slide repeatedly at a speed of 10 mm/sec.

Second sliding bodies 14 and 15 constituting bearings had diamonds 16 and 17, respectively, having a radius of 1 mm at their tips. The distance L between the second sliding bodies 14 and 15 was set at 20 mm. The sample was caused to vertically slide by 30 mm so that both of the metal thin film 12, which was a deposited portion, and the alumina sintered body, which was an undeposited portion, could pass through the second sliding bodies 14 and 15.

The test was carried out in the atmosphere in an unlubricated state. After a 20-hour continuous sliding test, the existence or absence of a sliding track was examined by an optical microscope and a scanning electron microscope. Several sliding tracks were observed on the alumina sintered body, which was an undeposited portion, while the metal thin film, which was an Nb deposited portion, had produced no Nb film separation, or scarcely any sliding track. This proves that the metal thin film of consisting of Nb had prevented the wear of the ceramic base portion consisting of the alumina sintered body.

The same tests were carried out when an Nb oxide was used in place of Nb, when $2 \times 10^{16}$ ions/cm$^2$ of Ar$^+$ of 280 KeV was implanted on the metal film of Nb, and when a silicon nitride sintered body was used in place of the alumina sintered body and Si was used in place of Nb. The same results as the above were obtained in all of these cases.

While there has been described what are at present considered to be preferred embodiments of the invention, it will be understood that various modifications may be made thereto, and it is intended that the appended claims cover all such modifications as fall within the true spirit and scope of the invention.

What is claimed is:

1. An unlubricated sliding member comprising:
    a first sliding body having a first sliding part, said first sliding part being composed of a ceramic base portion and a thin film which is integrally provided on the surface of said ceramic base portion and which is composed of at least one selected from the group consisting of metals of Nb, Cr, Ti, Zr, Hf, Y and Si and oxides of said metals; and
    a second sliding body having a second sliding part which comes into sliding contact with said first sliding part, said second sliding part being composed of a diamond containing surface portion.

2. An unlubricated sliding member according to claim 1, wherein said ceramic base portion is a ceramic sintered body, a ceramic single crystal, or a ceramic coated layer.

3. An unlubricated sliding member according to claim 1, wherein said first sliding part is composed of a ceramic base portion which constitutes a bearing portion having a shaft hole, and a thin film formed on the surface of the inner peripheral portion which constitutes said shaft hole of said bearing portion, and said second sliding portion is a shaft portion which is inserted into said shaft hole of said bearing portion rotatably or linearly reciprocatably, and which has a diamond containing surface.

4. An unlubricated sliding member according to claim 1, wherein said second sliding part is a bearing portion which has a shaft hole and a diamond containing surface at the inner peripheral portion which constitutes said shaft hole, and said first sliding part is composed of a ceramic base portion which constitutes a shaft portion which is inserted into said shaft hole rotatably or linearly reciprocatably and a thin film which is formed at the outer peripheral portion of said shaft potion.

5. An unlubricated sliding member according to claim 1, wherein said first sliding part is composed of a ceramic portion which constitutes a rail and a thin film which is formed on the surface of the outer peripheral portion of said rail, and said second sliding part is a sliding component which reciprocates along the rail and which has a diamond containing surface.

6. An unlubricated sliding member according to claim 1, wherein said thin film is a film formed by vacuum deposition, electron beam deposition, sputtering, ion plating, cluster or ion beam deposition.

7. An unlubricated sliding member according to claim 1, wherein said thin film has a thickness of 100 angstrom to 1 $\mu$m.

8. An unlubricated sliding member according to claim 1, wherein said ceramic base portion has said surface subjected to ion implantation.

9. An unlubricated sliding member according to claim 8, wherein said ceramic base portion has said surface subjected to said ion implantation of at least one selected from the group consisting of H$^+$, He$^+$, N$^+$, O$^+$, Ar$^+$, Kr$^+$, Xe$^+$ and Si$^+$.

10. An unlubricated sliding member according to claim 8, wherein said ions penetrate to a depth greater than the thickness of said thin film.

11. An unlubricated sliding member according to claim 8, wherein said ceramic base portion has said surface subjected to ion implantation with ions in an amount of $5 \times 10^{14}$ to $5 \times 10^{17}$ ions/cm$^2$.

12. An unlubricated sliding member according to claim 8, wherein said ceramic base portion is composed of SiC and said ceramic base portion has said surface of Nb subjected to ion implantation of Ar$^+$.

* * * * *